United States Patent
Schultz

(10) Patent No.: US 7,401,687 B2
(45) Date of Patent: Jul. 22, 2008

(54) DUAL CLUTCH ENGINE COUPLING DAMPER

(75) Inventor: John C. Schultz, Saline, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 264 days.

(21) Appl. No.: 11/197,125

(22) Filed: Aug. 4, 2005

(65) Prior Publication Data

US 2006/0065504 A1    Mar. 30, 2006

Related U.S. Application Data

(60) Provisional application No. 60/614,854, filed on Sep. 30, 2004.

(51) Int. Cl.
F16H 45/02  (2006.01)
(52) U.S. Cl. .................. 192/3.27; 192/87.14; 192/212; 192/107 M
(58) Field of Classification Search ................. 192/3.27
See application file for complete search history.

(56) References Cited

U.S. PATENT DOCUMENTS

| | | | |
|---|---|---|---|
| 5,009,301 A | | 4/1991 | Spitler .................. 192/213.3 |
| 5,213,186 A | * | 5/1993 | Murata ..................... 477/169 |
| 5,361,880 A | * | 11/1994 | Bojas ....................... 192/3.25 |
| 5,484,354 A | | 1/1996 | Vukovich et al. ........... 477/174 |
| 5,788,034 A | * | 8/1998 | Maruki et al. .............. 192/3.29 |
| 5,924,954 A | | 7/1999 | Vukovich et al. ............. 477/46 |
| 6,453,864 B1 | | 9/2002 | Downs et al. ............ 123/179.3 |
| 2001/0006136 A1 | * | 7/2001 | Menard et al. ............. 192/3.29 |

* cited by examiner

Primary Examiner—Richard M Lorence

(57) ABSTRACT

A dual clutch engine coupling damper includes a slipping ECCC clutch in series with a plurality of damper springs, and a bypass clutch in parallel with the damper springs. The ECCC is adapted for use when the vehicle engine is running and the bypass clutch is adapted for use when the vehicle engine is being started. The dual clutch engine coupling damper incorporates a single pressure plate design adapted to actuate both the ECCC clutch and the bypass clutch. The single pressure plate design is compact and minimizes axial space requirements for the apparatus. Additionally, the components of the present invention are primarily stamped parts which may be produced in an inexpensive and efficient manner.

23 Claims, 2 Drawing Sheets

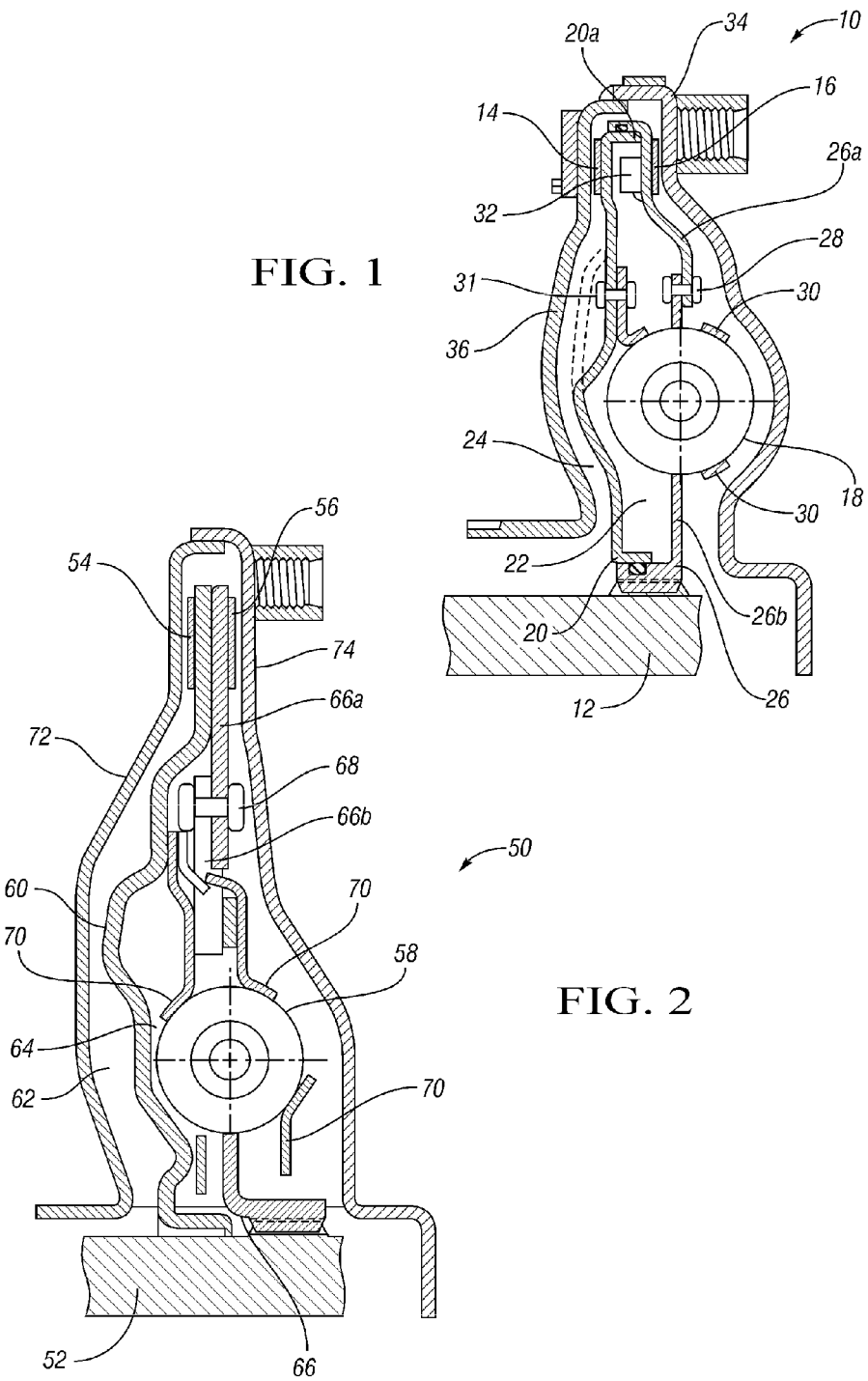

DUAL CLUTCH ENGINE COUPLING DAMPER

CROSS REFERENCE TO RELATED APPLICATIONS

This Application claims the benefit of U.S. Provisional Application 60/614,854, filed Sep. 30, 2004, which is hereby incorporated by reference in its entirety.

TECHNICAL FIELD

This invention relates to a dual clutch engine coupling damper.

BACKGROUND OF THE INVENTION

In a standard vehicle drive system it is well known to provide a torque converter between the crankshaft of an internal combustion engine and a transmission. Typically, such torque converters include a clutch to produce a direct drive connection between the engine and the transmission. Furthermore, such torque converters generally include a damper assembly to absorb torque fluctuations.

SUMMARY OF THE INVENTION

The dual clutch engine coupling damper of the present invention includes a slipping electronically controlled converter clutch (hereinafter ECCC) in series with a plurality of damper springs, and a bypass clutch in parallel with the damper springs. The ECCC is adapted for use while the vehicle is being operated and the bypass clutch is adapted for use when the vehicle engine is being started. The ECCC is described in commonly owned United States patent entitled Controlled Capacity Torque Converter Clutch Control System, U.S. Pat. No. 5,484,354, and is hereby incorporated by reference in its entirety.

The ability to include an ECCC clutch in the same packaging environment as other engine coupling concepts allows existing production calibration expertise with ECCC systems in torque converters to be implemented for improved driveability. The apparatus of the present invention enables software calibration to avoid driveline resonances and other unfavorable forced disturbances to provide good driveability across disparate engine and vehicle applications.

The dual clutch engine coupling damper incorporates a single pressure plate design adapted to actuate both the ECCC clutch and the bypass clutch. The single pressure plate design is compact and minimizes axial space requirements for the apparatus. Additionally, the components of the present invention are primarily stamped parts which represent a significant cost savings.

In one aspect of the present invention, the apparatus of the present invention includes a damper hub adapted to retain the damper springs. The damper hub includes an upper portion to which the bypass clutch is attached and a lower portion engaging the damper springs.

In another aspect of the present invention, the ECCC clutch is composed of a carbon based material to facilitate slip.

In yet another aspect of the present invention, the bypass clutch is composed of a cellulose based material.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic cross-sectional composite view of a dual clutch engine coupling damper;

FIG. 2 is a schematic cross-sectional composite view of an alternate dual clutch engine coupling damper.

DESCRIPTION OF THE PREFERRED EMBODIMENTS

Figure 3:
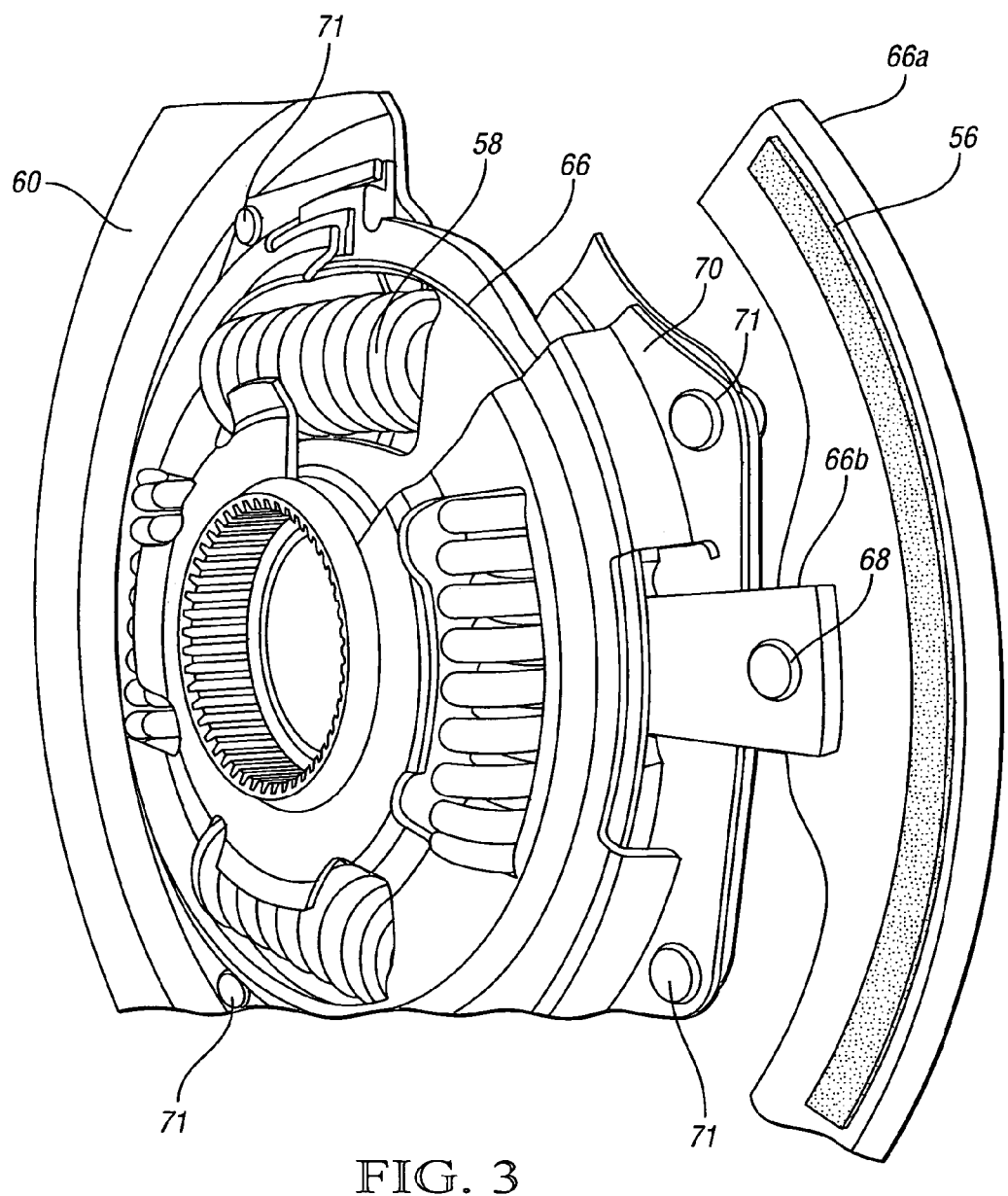
FIG. 3 is an isometric partial cutaway illustration of the alternate dual clutch engine coupling damper of FIG. 2.

Referring to the drawings wherein like reference numbers refer to like components, FIG. 1 shows the upper half of a dual clutch engine coupling damper 10. It should be appreciated that the dual clutch engine coupling damper 10 is generally symmetrical about a main transmission shaft 12 such that the bottom half of the damper (not shown) is similar to that of the upper half shown in FIG. 1.

The dual clutch engine coupling damper 10 includes an electronically controlled converter clutch or ECCC 14 as described in incorporated U.S. Pat. No. 5,484,354, and a bypass clutch 16. The ECCC 14 is adapted for use while the vehicle is being operated and the bypass clutch 16 is adapted for use when the vehicle engine (not shown) is being started.

The ECCC 14 is disposed in series with a plurality of damper springs 18, and the bypass clutch 16 is disposed in parallel with the damper springs 18. The parallel connection between the bypass clutch 16 and the damper springs 18 allows the bypass clutch 16 to bypass the damper springs 18 to form a rigid connection between the engine and the transmission (not shown) when the vehicle is being started. The series connection between the ECCC 14 and the damper springs 18 incorporates the damper springs 18 into the connection between the engine and transmission to partially absorb any torque spikes and provide smoother powertrain operation. The ECCC 14 is preferably composed of a carbon based material to facilitate slip. The bypass clutch 16 is preferably composed of a cellulose based material having a higher coefficient of friction such that the bypass clutch 16 activates at a lower apply chamber pressure and provides a seal.

The dual clutch engine coupling damper 10 further includes a pressure plate 20 adapted to actuate both the ECCC 14 and the bypass clutch 16. It should be appreciated that providing a single pressure plate 20 configured to actuate both ECCC 14 and bypass clutch 16 allows a more compact design for the engine coupling damper 10 which therefore has minimal axial space requirements. The pressure plate 20 preferably includes a lip portion 20a adapted to facilitate engagement of the bypass clutch 16. Apply chambers 22 and 24 are disposed on opposite sides of the pressure plate 20 and are adapted to actuate the ECCC 14 and bypass clutch 16 as will be described in detail hereinafter.

A damper hub 26 is preferably composed of a radially outer portion 26a and an inner portion 26b attached thereto by a rivet 28. The inner portion 26b of the damper hub 26 engages the damper springs 18 and is therefore preferably hardened to resist wear. The outer portion 26a of the damper hub 26 has the friction material of the bypass clutch 16 bonded thereto and is preferably not hardened as such a composition would make the bonding process more difficult.

The bypass clutch 16 disposed in parallel with the damper springs 18 provides a solid mechanical connection between the engine and transmission when a vehicle is being started. It is well known, however, that when the engine is running it periodically produces objectionable pulses or torque spikes. The ECCC 14 is therefore disposed in series with the damper springs 18 such that during operation at least a portion of any engine torque spike may be absorbed by the damper springs 18. Additionally, the ECCC 14 is adapted to further absorb a portion of an engine torque spike by controlled slipping. In other words, the ECCC 14 may be programmed to slip by an amount necessary to prevent the engine torque spike from being transferred to the transmission.

The dual clutch engine coupling damper 10 includes a first housing member 34 and a second housing member 36. The ECCC 14 and bypass clutch 16 are preferably controlled by an electro-hydraulic control system (not shown). Accordingly, actuation of the ECCC 14 and bypass clutch 16 may be controlled by regulating the pressure in apply chambers 22 and 24. More precisely, if the pressure in apply chamber 22 exceeds the pressure in apply chamber 24, the pressure plate 20 is shifted from right to left as viewed in FIG. 1, such that the ECCC 14 engages the housing member 36. If the pressure in apply chamber 24 exceeds the pressure in apply chamber 22, the pressure plate 20 is shifted from left to right as viewed in FIG. 1, such that the lip portion 20a of the pressure plate 20 pushes the bypass clutch 16 into engagement with the housing member 34.

The dual clutch engine coupling damper 10 optionally includes a spring cage 30 and a tuning ring 32. The spring cage 30 is preferably rigidly mounted to the pressure plate 20 with, for example, the rivet 31. It should be appreciated that the spring cage 30 may alternatively be mounted to the pressure plate 20 in any other conventional manner. The spring cage 30 forms a pocket or chamber to contain the damper springs 18. Accordingly, the spring cage 30 may be implemented to prevent the damper springs 18 from becoming dislodged as they are compressed during actuation of the ECCC 14. The spring cage 30 is preferably composed of hardened steel to resist wear caused by contact with the damper springs 18. The tuning ring 32 adds a predetermined amount of mass to the radially outer portion 26a of the damper hub 26. As is known in the art, an engine coupling damper may be "tuned" to reduce noise and/or vibration by generating inertia through the use of a tuning ring such as the tuning ring 32.

FIG. 2 shows an alternate embodiment of the present invention including the upper half of a dual clutch engine coupling damper 50. It should be appreciated that the dual clutch engine coupling damper 50 is generally symmetrical about a main transmission shaft 52 such that the bottom half of the damper (not shown) is similar to that of the upper half shown in FIG. 2.

The dual clutch engine coupling damper 50 has an ECCC 54, and a bypass clutch 56. The ECCC clutch 54 is disposed in series with a plurality of damper springs 58, and the bypass clutch 56 is disposed in parallel with the damper springs 58. The ECCC 54 is preferably composed of a carbon based material to facilitate slip. The bypass clutch 56 is preferably composed of a cellulose based material having a higher coefficient of friction such that the bypass clutch 56 activates at a lower apply chamber pressure and provides a seal.

The dual clutch engine coupling damper 50 further includes a pressure plate 60 adapted to actuate both the ECCC 54 and the bypass clutch 56. It should be appreciated that providing a single pressure plate 60 configured to actuate both ECCC 54 and bypass clutch 56 allows a more compact design for the engine coupling damper 50 which therefore has minimal axial space requirements. Apply chambers 62 and 64 are disposed on opposite sides of the pressure plate 60 and are adapted to actuate the ECCC 54 and bypass clutch 56 as will be described in detail hereinafter.

A damper hub 66 is preferably composed of a radially outer portion 66a and an inner portion 66b attached thereto by a rivet 68. The inner portion 66b of the damper hub 66 engages the damper springs 58 and is therefore preferably hardened to resist wear. The outer portion 66a of the damper hub 66 has the friction material of the bypass clutch 56 bonded thereto and is preferably not hardened as such a composition would make the bonding process more difficult.

As described hereinabove with respect to the dual clutch engine coupling damper 10 (shown in FIG. 1), the bypass clutch 56 disposed in parallel with the damper springs 58 provides a solid mechanical connection between the engine and transmission when a vehicle is being started. The ECCC 54 is disposed in series with the damper springs 58 such that during operation at least a portion of any engine torque spike may be absorbed by the damper springs 58. Additionally, the ECCC 54 is adapted to further absorb a portion of an engine torque spike by controlled slipping in the manner previously described with respect to the ECCC 14 (shown in FIG. 1).

The dual clutch engine coupling damper 50 includes a first housing member 74 and a second housing member 72. The ECCC 54 and bypass clutch 56 are preferably controlled by an electro-hydraulic control system (not shown). Accordingly, actuation of the ECCC 54 and bypass clutch 56 may be controlled by regulating the pressure in apply chambers 62 and 64. More precisely, if the pressure in apply chamber 64 exceeds the pressure in apply chamber 62, the pressure plate 60 is shifted from right to left as viewed in FIG. 2, such that the ECCC 54 engages the housing member 72. If the pressure in apply chamber 62 exceeds the pressure in apply chamber 64, the pressure plate 60 is shifted from left to right as viewed in FIG. 2, such that the pressure plate 60 pushes the outer portion 66a of the damper hub 66 to bring the bypass clutch 56 into engagement with the housing member 74.

The dual clutch engine coupling damper 50 optionally includes a spring cage 70 adapted to retain the damper springs 58. The spring cage 70 is preferably rigidly mounted to the pressure plate 60 with, for example, the rivets 71. It should be appreciated that the spring cage 70 may alternatively be mounted to the pressure plate 60 in any other conventional manner. The spring cage 70 forms a pocket or chamber to contain the damper springs 58. Accordingly, the spring cage 70 may be implemented to prevent the damper springs 58 from becoming dislodged as they are compressed during actuation of the ECCC 54. The spring cage 70 is preferably composed of hardened steel to resist wear caused by contact with the damper springs 58.

Referring to FIG. 3, an isometric partial cutaway view of the dual clutch engine coupling damper 50 is shown. As shown, the damper springs 58 are circumscribed by the damper hub 66 to which the bypass clutch 56 is mounted. Accordingly, engagement of the bypass clutch 56 establishes a mechanical connection allowing transfer of energy from the engine (not shown) through the housing member 74 (shown in FIG. 2), the bypass clutch 56, the damper hub 66, the transmission shaft 52 (shown in FIG. 2), and into the transmission (not shown). In this manner, a rigid connection between the engine and the transmission is established without engaging the damper springs 58.

Engagement of the ECCC 54 (shown in FIG. 2) establishes a mechanical connection allowing transfer of energy from the engine (not shown), through the housing members 72, 74, the ECCC 54, the pressure plate 60, the spring cage 70, the damper springs 58, the damper hub 66, the transmission shaft 52 (shown in FIG. 2), and into the transmission (not shown). Therefore, as the ECCC 54 is engaged, the damper springs 58 are compressed between the spring cage 70 and the damper hub 66. In this manner, the compression of the damper springs 58 during ECCC engagement is implemented to dampen or absorb at least a portion of any torque spikes and thereby provide smoother vehicle operation.

While the best mode for carrying out the invention has been described in detail, those familiar with the art to which this invention relates will recognize various alternative designs and embodiments for practicing the invention within the scope of the appended claims.

The invention claimed is:

1. A dual clutch engine coupling damper comprising:
a plurality of damper springs;
an electronically controlled converter clutch disposed in series with said plurality of damper springs;
a bypass clutch disposed in parallel with said plurality of damper springs; and
a pressure plate adapted to move in a first direction to actuate said electronically controlled converter clutch and to move in a second opposing direction to actuate said bypass clutch.

2. The dual clutch engine coupling damper of claim 1, further comprising first and second apply chambers disposed on opposite sides of said pressure plate.

3. The dual clutch engine coupling damper of claim 1, further comprising a spring cage mounted to said pressure plate, said spring cage being adapted to retain said plurality of damper springs.

4. The dual clutch engine coupling damper of claim 3, further comprising a damper hub having said bypass clutch mounted thereto, said damper hub being adapted to compress said plurality of damper springs when said electronically controlled converter clutch is applied.

5. The dual clutch engine coupling damper of claim 4, wherein said damper hub is a stamped component.

6. The dual clutch engine coupling damper of claim 5, wherein at least a portion of the damper hub is composed of hardened steel.

7. The dual clutch engine coupling damper of claim 1, wherein the electronically controlled converter clutch is composed of a carbon based material to facilitate slip.

8. The dual clutch engine coupling damper of claim 1, wherein the bypass clutch is composed of a cellulose based material.

9. A dual clutch engine coupling damper comprising:
a damper hub;
a plurality of damper springs engaged by the damper hub;
an electronically controlled converter clutch disposed in series with said plurality of damper springs;
a bypass clutch mounted to said damper hub and disposed in parallel with said plurality of damper springs; and
a pressure plate adapted to move in a first direction to actuate said electronically controlled converter clutch and to move in a second opposing direction to actuate said bypass clutch.

10. The dual clutch engine coupling damper of claim 9, further comprising first and second apply chambers disposed on opposite sides of said pressure plate.

11. The dual clutch engine coupling damper of claim 10, further comprising a spring cage mounted to said pressure plate, said spring cage being adapted to retain said plurality of damper springs.

12. The dual clutch engine coupling damper of claim 11, wherein said damper hub includes an upper portion having said bypass clutch mounted thereto, and a lower portion engaged by said damper springs.

13. The dual clutch engine coupling damper of claim 12, wherein said damper hub is a stamped component.

14. The dual clutch engine coupling damper of claim 13, wherein at least a portion of the damper hub is composed of hardened steel.

15. The dual clutch engine coupling damper of claim 10, wherein the electronically controlled converter clutch is composed of a carbon based material to facilitate slip.

16. The dual clutch engine coupling damper of claim 10, wherein the bypass clutch is composed of a cellulose based material.

17. A dual clutch engine coupling damper comprising:
a damper hub including a radially outer portion and an inner portion;
a plurality of damper springs engaged by the inner portion of the damper hub;
an electronically controlled converter clutch disposed in series with said plurality of damper springs;
a bypass clutch mounted to the outer portion of the damper hub and disposed in parallel with said plurality of damper springs;
a pressure plate adapted to move in a first direction to actuate said electronically controlled converter clutch and to move in a second opposing direction to actuate said bypass clutch, said single pressure plate allowing a more compact design for the dual clutch engine coupling damper;
a spring cage mounted to said pressure plate, said spring cage being adapted to retain said plurality of damper springs; and
first and second apply chambers disposed on opposite sides of said pressure plate.

18. The dual clutch engine coupling damper of claim 17, wherein the electronically controlled converter clutch is composed of a carbon based material to facilitate slip.

19. The dual clutch engine coupling damper of claim 18, wherein the bypass clutch is composed of a cellulose based material.

20. The dual clutch engine coupling damper of claim 17, wherein said damper hub is a stamped component.

21. The dual clutch engine coupling damper of claim 1, wherein said electronically controlled converter clutch and said bypass clutch are disengaged when said pressure plate is not actuated.

22. The dual clutch engine coupling damper of claim 9, wherein said electronically controlled converter clutch and said bypass clutch are disengaged when said pressure plate is not actuated.

23. The dual clutch engine coupling damper of claim 17, wherein said electronically controlled converter clutch and said bypass clutch are disengaged when said pressure plate is not actuated.

* * * * *